US008614808B2

(12) United States Patent
Gauer (10) Patent No.: US 8,614,808 B2
(45) Date of Patent: Dec. 24, 2013

(54) PRINTED DOCUMENT IDENTIFICATION

(75) Inventor: Michael J. Gauer, Eagan, MN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2625 days.

(21) Appl. No.: 10/728,683

(22) Filed: Dec. 5, 2003

(65) Prior Publication Data

US 2005/0122538 A1    Jun. 9, 2005

(51) Int. Cl.
*G06F 3/12* (2006.01)

(52) U.S. Cl.
USPC .......................... 358/1.15; 358/1.14; 358/1.2

(58) Field of Classification Search
USPC ......... 358/1.2, 1.1, 1.15, 3.31, 1.18; 395/102; 379/355.06; 715/764
See application file for complete search history.

(56) References Cited

U.S. PATENT DOCUMENTS

| | | | |
|---|---|---|---|
| 5,930,350 A * | 7/1999 | Johnson | 379/355.06 |
| 6,437,876 B1 * | 8/2002 | Phang et al. | 358/1.2 |
| 6,661,530 B1 * | 12/2003 | Munetomo et al. | 358/1.15 |
| 6,809,841 B2 * | 10/2004 | Brewster | 358/3.31 |
| 6,865,284 B2 * | 3/2005 | Mahoney et al. | 382/112 |
| 6,924,826 B1 * | 8/2005 | Nakagiri et al. | 715/700 |
| 2002/0051206 A1 * | 5/2002 | Masaki | 358/1.18 |
| 2003/0112462 A1 * | 6/2003 | Ochiai | 358/1.15 |
| 2005/0216851 A1 * | 9/2005 | Hull et al. | 715/764 |

OTHER PUBLICATIONS

Adobe, Installing and Using the AdobePS™ Printer Driver, May 1998, pp. 1-20.

* cited by examiner

*Primary Examiner* — David K Moore
*Assistant Examiner* — Ashish K. Thomas (57) ABSTRACT

Techniques for printed document identification allow a user to more readily identify a printed document. The techniques may include receiving document data for printing a document and accessing information to identify the document for printing. Document data may relate to printed document properties, such as, for example, document appearance and document content. The document data and the accessed identifying information may be formatted to appropriately meet the requirements of the printer. Formatting the document data and the accessed identifying information for printing may include formatting a page for printing such that the page includes at least a portion of the document data and the accessed identifying information, and the accessed identifying information is between document margins and printer allowable margins.

33 Claims, 5 Drawing Sheets

PRINTED DOCUMENT IDENTIFICATION

TECHNICAL FIELD

This description relates to document printing, and more particularly, to printed document identification.

BACKGROUND

Numerous document print requests may be sent to a printer at a given time. Each request may constitute a separate printing job for the printer. Document data associated with each document to be printed may be formatted in relation to the requirements of the printer and printed.

Conventional techniques for identifying printed documents include printing a separate page, often referred to as "a banner page," that is automatically prefixed to and printed out as part of the printing job. Banner pages typically include information that identifies a printout. Banner pages are not only helpful in identifying a printout, but also may be useful, for example, in helping users find their printouts on a shared printer.

SUMMARY

Techniques are provided for printed document identification. In one general aspect, document data for printing a document from an application is received, and information associated with a sender of the document data is accessed. Additionally, a page to be printed is formatted such that the page includes at least a portion of the received document data and the accessed information, and the accessed information is located between document margins and printer allowable margins. The technique may be performed, for example, by a machine operating under the control of a set of instructions.

Particular implementations may include one or more of the following features. For example, a request to format information associated with a sender of document data may be received, and a user interface that allows formatting of information associated with a sender of the document data may be generated. The user interface may allow a user to specify the orientation, the content, the presentation style, and/or the location of information associated with a sender of document data. As another example, formatting a page to be printed may include checking whether the accessed information for the formatted page fits between the document margins and the printer allowable margins. An alert may be generated if the accessed information for the formatted page does not fit between the document margins and the printer allowable margins. Also, changes to the format of the accessed information may be allowed.

As a further example, the received document data may be associated with a sender of the document data. The association may be performed, for example, by determining a sender identifier accompanying the document data. As another example, accessing information associated with a sender of document data may include querying a database including sender associated information. As an additional example, a message including the formatted page may be generated.

In another general aspect, document data for printing a document from an application may be received, wherein the document data includes data relating to content and format of a document. An identifier associated with a sender of the document data may be determined. Information associated with a sender of the document data may be accessed by querying a database including sender associated information, for example.

A page to be printed may be formatted such that the page includes at least a portion of the received document data and the accessed information, and the accessed information is between document margins and printer allowable margins. The accessed information for the formatted page may be checked to determine if the accessed information fits between the document margins and the printer allowable margins. If the accessed information for the formatted page does not fit between the document margins and the printer allowable margins, an alert may be generated. A user interface that allows formatting of content, location, orientation, and appearance of information associated with a sender may be generated. If formatting of the page is complete, a message including the formatted page may be generated.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques for printed document identification allow a user to more readily identify a printed document. The techniques may include receiving document data for printing a document from an application and accessing information to identify the document after printing. Document data may relate to printed document properties, such as, for example, document appearance and document content. The document data and the accessed identifying information may be formatted to appropriately meet the requirements of the printer. Formatting the document data and the accessed identifying information for printing may include formatting a page for printing such that the page includes at least a portion of the document data and the accessed identifying information, and the accessed identifying information is located between document margins and printer allowable margins. Printed document identification, however, may also be accomplished by a variety of other techniques.

Figure 1:
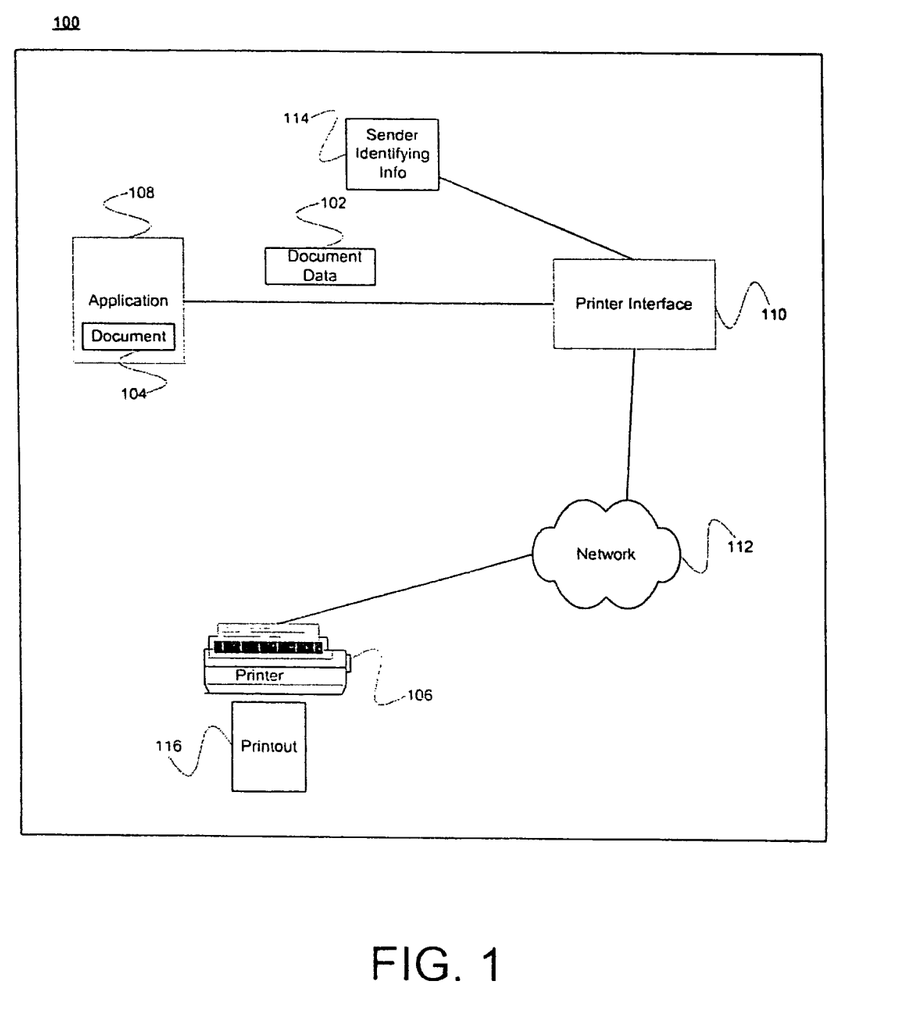
FIG. 1 is a block diagram illustrating a system for printed document identification.

FIG. 1 illustrates a system 100 for printed document identification. The system 100 includes document data 102, which is associated with a document 104 to be printed at a printer 106. A document is a collection of information created and/or accessed using an application 108, where the application may be any association of logical statements that dictate the manipulation of information. The application 108 may be located on a device, such as, for example, a personal computer (PC), a workstation (WS), or a personal digital assistant (PDA). Additionally, the application 108 may be, for example, a word processing application, a spreadsheet application, a drawing application, or a database application.

Typically, if a document is to be printed, document data associated with the document is formatted in relation to the requirements of a printer at which the document will be printed. In general, document data refers to data associated with a document. Document data may include information related to the appearance of a document, such as, for example, font characteristics, page orientation, and/or margin specifications. Document data also may include information related to the content of a document, such as, for example, text, graphics, and tables in a word processing document or numbers in a spreadsheet. In the illustrated implementation, the application 108 sends a request to print the document 104 at the printer 106, and a printer interface 110 is used to format the document data 102 for printing. All or a portion of the document data 102 may be sent with the request to print the document 104. As another example, the document data 102 may be sent in subsequent messages to the printer. The printer interface 110 merges the document data 102 with identifying information associated with a sender of the document data 102 and sends the merged document data and identifying information to the printer 106.

In more detail, the printer interface 110 may be any entity appropriate to serve as a translator between a printer and applications that have documents to be printed. For example, the printer interface 110 may include, be a part of, be an add-on to, or be otherwise associated with a printer driver and/or a printer controller. In general, a printer driver is any software application appropriate for communicating data to a printer from one or more applications that have documents to be printed. A printer typically has an associated printer driver to facilitate the printing of documents sent from various applications. A printer controller is any device appropriate to control transfer of data to a printer from an application, which may reside on a device such as a PC, a WS, or a PDA. The printer interface may also be part of an application or an independent application.

As mentioned, the printer interface 110 may be implemented using software or hardware. For example, the printer interface 110 may be implemented using a memory operable to store received document data and instructions, which may dictate the operations of the printer interface. In general, memory may be any device appropriate for storing information. Memory may include random access memory (RAM), read-only memory (ROM), compact-disk read-only memory (CD-ROM), and/or registers. The implementation also may include a processor operable to access identifying information and to format a page to be printed such that all or a portion of the identifying information is located between the document margins and the printer allowable margins. In general, a processor may be any device for manipulating information in a logical manner. A processor may, for example, be a reduced instruction set computer (RISC) or a complex instruction set computer (CISC).

Additionally, the printer interface 110 may use a page description language (PDL), such as, for example, printer control language (PCL) or Post Script (PS), or any other appropriate protocol, to communicate with the printer 106. The printer interface 110 may be located on a machine that is executing the application 108.

The printer interface 110 may communicate with the printer 106 using a network 112. The network 112 may include one or more of a variety of established networks, such as, for example, the Internet, a Public Switched Telephone Network (PSTN), the World Wide Web (WWW), a wide area network (WAN), a local area network (LAN), or a wireless network.

The system 100 also includes sender identifying information 114 associated with users of the system 100. For example, the sender identifying information 114 may include, for a particular user, a user name, a network identifier, an organizational job title, and/or a name of a department associated with a user. The sender identifying information may be accessed, for example, by using an identifier accompanying the document data 102.

The sender identifying information 114 may be stored in a database. Additionally, the sender identifying information 114 may be located on a machine that executes the application 108. As another example, the sender identifying information 114 may be stored on a server that may be accessed using a network, such as, for example, the network 112. In other implementations, the sender identifying information may arrive with or be part of the document data 102.

The printer 106 produces a printout 116 in response to a print request. In general, a printout presents the content of a document in a physical format. A printout may be one or more printed pages of the document. In the illustrated example, the printout 116 results when a request to print the document 104 is made.

In one mode of operation, printed document identification may include having the printer interface 110 access identifying information related to a sender of the document 104. The sender may be a user, a system, a device, an application, a job, or any other entity that is able to send and/or initiate print requests. For example, the printer interface 110 may access sender identifying information 114 related to the user who requested printing of the document 104 or the machine where printing of the document 104 was requested. The identifying information also may include information relating to a device such as a PC, WS, PDA, or server that sent or initiated a request to print a document. The identifying information relating to a device may include an Internet Protocol (IP) and/or a network ID associated with the device. Additionally, the identifying information may include information relating to a file name, a print queue, or a server associated with the document 104.

In one implementation, the document data 102 may be formatted such that the identifying information lies between margins of the document 104 and allowable margins of the printer 106 for a printed page of the printout 116. Not all of the accessed information, however, has to be used. A user interface may be generated, for example, to allow a user to format the appearance, orientation, location, and content of the identifying information.

The system 100 has a variety of features. For example, the system 100 does not require the time and cost of printing a banner page in addition to the page(s) of a document. Printing a banner page for every document printed wastes a great deal of resources, such as, for example, paper and printer toner. Printing identifying information on a document also makes it easier to find the printed document among multiple printouts. Thus, the system 100 allows easier identification of printouts by allowing the identifying information to appear on the printed pages of a document, without the environmental and financial costs of a banner page. In addition, the system 100 allows users to format identifying information by generating a user interface for formatting the identifying information.

Although FIG. 1 illustrates a system for printed document identification, other implementations may include fewer, additional, and/or different arrangements of components. For example, one or more applications may be executed by one or more machines that are coupled to a printer. As another example, one or more of a same type or of different types of printer interfaces may be included in the system. The printer interfaces may be co-located with the applications, and may receive multiple requests for multiple documents to be printed. Additionally, the system may include one or more of a same type or of different types of printers. As a further example, an identifier other than one associated with a sender may be used. Examples of other identifiers include a document title, a document author, the name of an initiating or sending application, or any other appropriate identifier.

Figure 2:
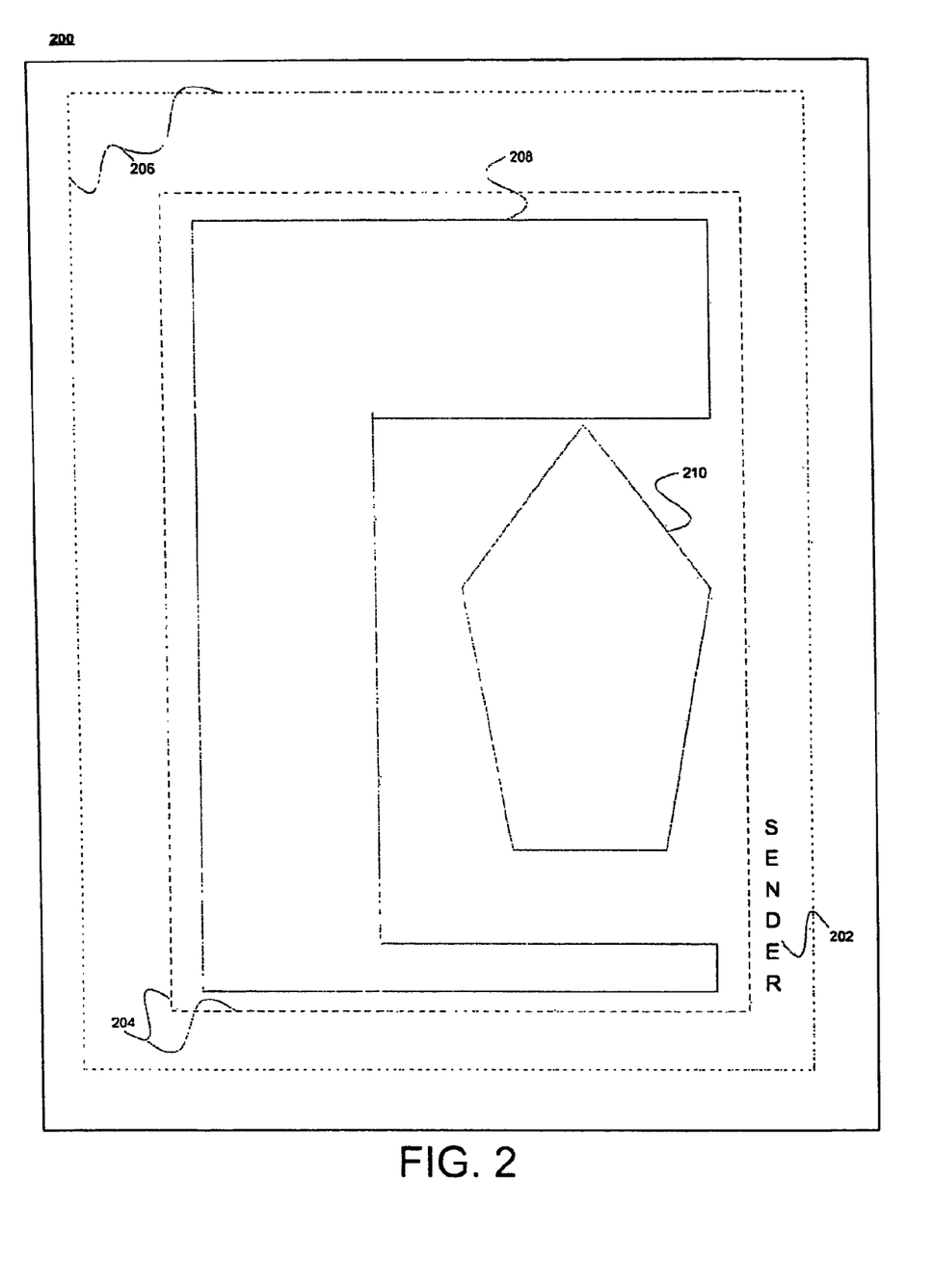
FIG. 2 is a block diagram of a document printed according to an implementation of the system of FIG. 1.

FIG. 2 illustrates a printed page 200 resulting from an implementation of printed document identification. The printed page 200 may represent any page of any of a number of documents, such as, for example a spreadsheet document, a graphics document, a database document, or a word processing document. The printed page 200 is an example of a page of the printout 116 of FIG. 1.

The printed page 200 includes identifying information 202, that identifies a document for printing. The identifying information 202 lies between document margins 204 and printer allowable margins 206 on the printed page 200.

In more detail, the document margins 204 relate to dimensions of a printed portion of a printed document. For example, margins of a word processing document specify how far text and graphics may extend vertically and horizontally. In general, text may include letters, numbers, and/or symbols. Graphics may include images, tables, and/or charts. Document margins may have default values that are automatically set by the application used to create a document. Additionally, document margins may be set by a user. Information relating to document margins may be contained in document data associated with the document.

Printer allowable margins relate to the dimensions that a printer is capable of printing. For example, a printer may only be able to print in an area starting 0.17 inches in from the left edge of a piece of paper, 0.17 inches down from the top edge of the piece of paper, 0.17 inches in from the right edge of the piece paper, and 0.17 inches up from the bottom edge of the piece of paper. Information relating to printer allowable margin specifications may be accessed, for example, by a printer interface associated with the printer.

In the example shown in FIG. 2, the identifying information 202 relates to a sender of a print request, where the sender may be a user or any device appropriate to initiate or generate print requests. Also, the printed page 200 includes text 208 and graphics 210. The identifying information 202 also may include textual and/or graphical information.

Although FIG. 2 illustrates one implementation of printed document identification, other implementations may include fewer, additional, and/or different arrangements of components. For example, although the identifying information 202 is shown printed vertically, alternate implementations may include identifying information oriented in any number of ways, such as, for example, horizontally or diagonally, between the document margins and the printer allowable margins. Additionally, the identifying information may be printed in other places, such as, for example, anywhere in the spaces between document margins and printer allowable margins.

The identifying information may be printed on different pages of the document. For example, the identifying information may be printed on only the first page of the document, on the first and last pages of the document, or on every page of the document.

Figure 3:
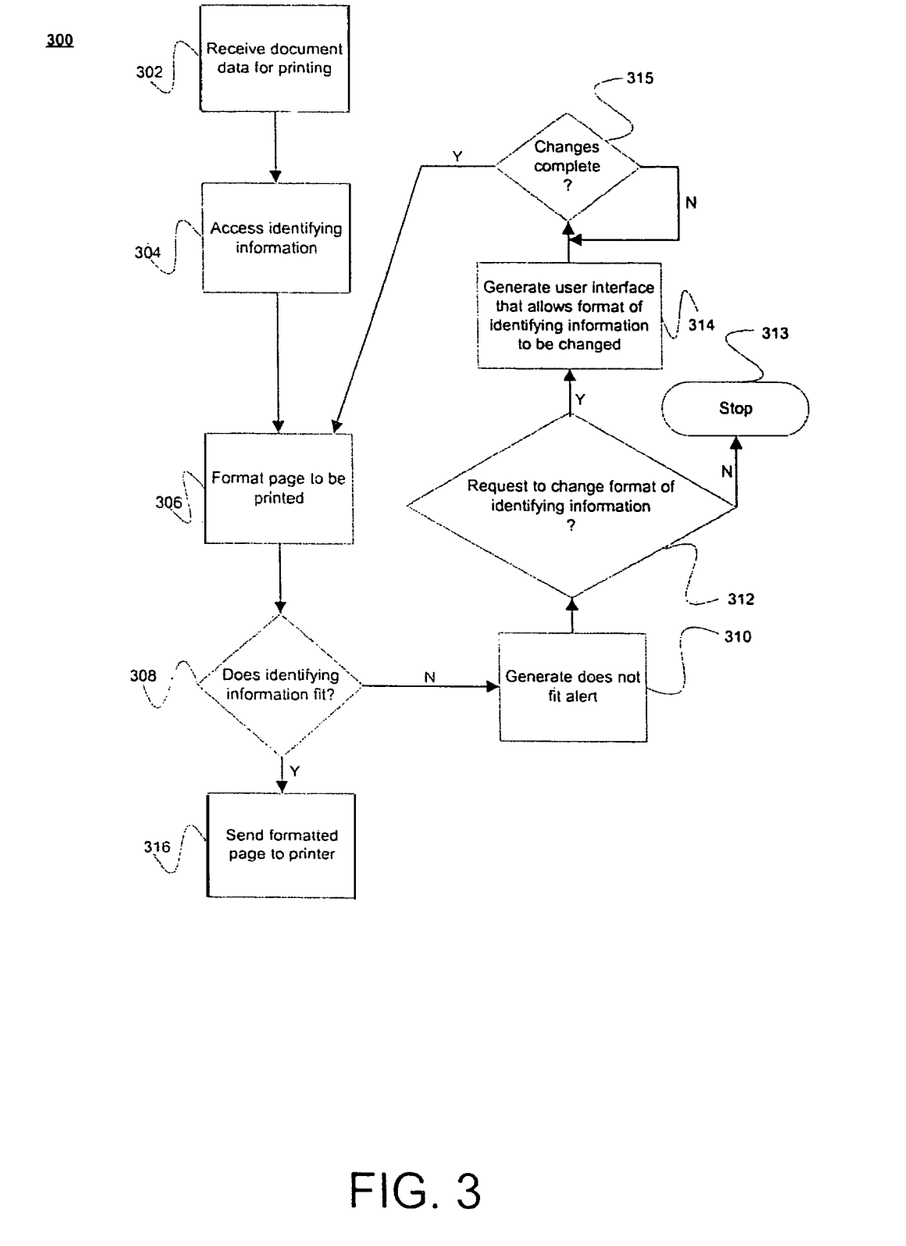
FIGS. 3 and 4 are flow charts illustrating procedures for printed document identification that may be implemented by the system of FIG. 1.

FIG. 3 is a flow chart illustrating a process 300 for printed document identification. The process 300 may be executed by a system similar to the system 100 of FIG. 1 to produce a printed page similar to the printed page 200 of FIG. 2.

The process 300 begins with the receipt of document data for printing a document from an application (operation 302). The document data may include information relating to the details of a document's layout and content (i.e., information relating to appearance of a document when printed). The document data may partially or fully describe a document. In one implementation, the document data may be received at a printer interface, as described earlier.

Once the document data is received, information associated with a sender of the document is accessed (operation 304). The accessed identifying information may, for example, relate to a user that initiated printing of the document. A page of the document for printing is formatted (operation 306) to associate the accessed identifying information with the received document data. Formatting a page of the document for printing may include having a printer interface merge the document data and the accessed identifying information to meet the requirements of a printer on which the document will be printed.

Identifying information may be placed on the page to identify the document when the document is printed. In one implementation, the identifying information may be placed between document margins and printer allowable margins, as described earlier. Placing the identifying information in the space between the document margins and the printer allowable margins may include checking whether the identifying information fits (operation 308) in that space without being cutoff or impinging on the document. For example, a printer interface may check printer requirements in conjunction with document data associated with a page for printing to determine if the dimensions of the printer allowable margins and the document margins allow the identifying information to fit in the space between the printer allowable margins and the document margins.

If the identifying information does not fit, an alert is generated (operation 310). The alert may be a pop-up window generated by a PC or WS for viewing by a user. The alert includes a message asking the user if he/she wants to change the format of the identifying information (operation 312). If the user does not choose to change the format of the identifying information, then the procedure stops (operation 313), and the printing of the document is not executed. In other implementations, the document is printed without the identifying information or the identifying information is printed although it is cutoff and/or impinges on the document.

If the user chooses to change the format of the identifying information, a user interface is generated (operation 314) to allow the user to alter the format of the identifying information. The process 300 includes waiting to receive a command that the changes are complete (operation 315). Once the changes are complete, then the operations 306, 308, 310, 312, 314, and 315 are repeated, as necessary, until the identifying information fits and all other formatting is complete. If all formatting is complete and the identifying information fits between the document margins and the printer allowable margins, the formatted page is sent for printing (operation 316).

Although FIG. 3 illustrates one implementation of a process for printed document identification, other implementations may include fewer, additional, and/or different arrangements of operations. For example, if the identifying information does not fit, the identifying information may be automatically reduced in size or repositioned to fit in the space between the document margins and the printer allowable margins, and, thus, no user interface may be generated to allow the user to adjust the identifying information. In addition, a user may not be offered a choice as to whether non-fitting identifying information should be altered. Instead, for example, the user may be automatically presented with a user interface prompting the user to alter the identifying information.

Figure 4:
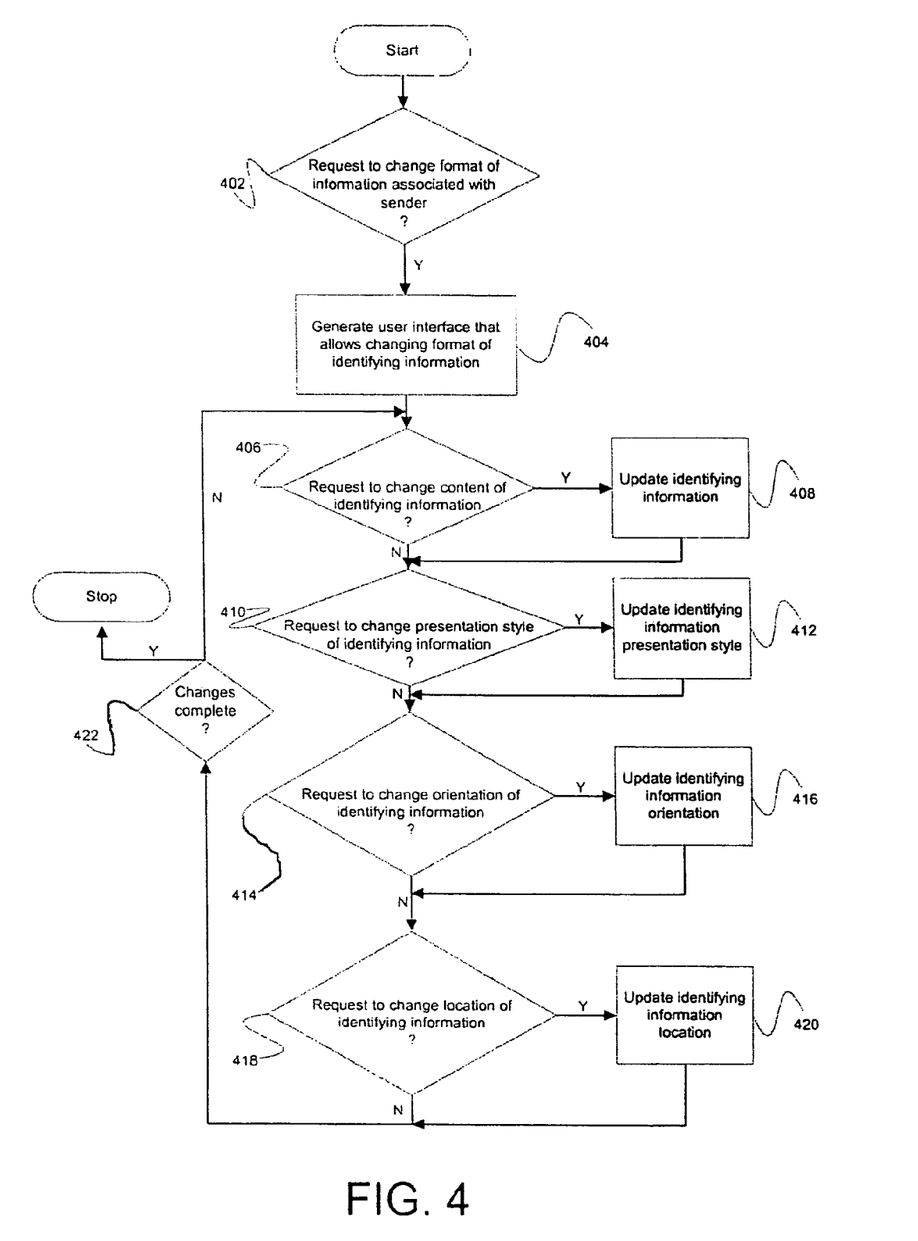

FIG. 4 is a flow chart illustrating a process 400 for printed document identification. The process 400 may begin, for example, when the identifying information does not fit in the space between the document margins and the printer allowable margins, as described with respect to the process 300 of FIG. 3. The process 400 also may begin when a request to format identifying information is generated by a user who is viewing and/or creating a document using an application. The request may be used to create or alter identifying information.

The process 400 begins with waiting to receive a request to change the format of identifying information associated with a sender of document data (operation 402). A user interface is generated in response to the request (operation 404). The user interface allows the format of identifying information to be changed. In general, a user interface is any electronic presentation appropriate for receiving information from an application, presenting information to a user, and receiving input from a user. A user interface may be, for example, a graphical user interface (GUI).

The generated user interface presents a user with a variety of options to change the format of identifying information. A user may request to change the content of the identifying information that is printed (operation 406). For example, the user interface may allow a user to select what parts of the identifying information may be printed on a page of the document. For instance, a user may choose to have their user ID printed on the document printout. The content of the identifying information will be updated as a result of the requested change (operation 408).

Using the generated user interface, a user also may request to change the presentation style of the identifying information (operation 410). For example, the user may desire to change the color, font, and size of the identifying information to be printed. The presentation style of the identifying information will be updated as a result of the format change request (operation 412).

The user also may request to change the orientation of the identifying information (operation 414). For example, the user may desire to have the identifying information printed diagonally in the space between the document margins and the printer allowable margins. The orientation of the identifying information will be updated as a result of the orientation change request (operation 416).

The user also may request to change the location of the identifying information (operation 418). For example, the user may desire to place the identifying information in the left blank space between the document margins and printer allowable margins. The location of the identifying information will be updated as a result of the location change request (operation 420).

The process 400 waits for a signal that changes are complete (operation 422). If the changes are not complete, the user interface continues to be displayed. Completion of changes ends the process 400.

Although FIG. 4 illustrates one implementation of a process for printed document identification, other implementations may include fewer, additional, and/or different arrangements of operations. For example, a user interface may not be generated. Instead a device and/or system responsible for formatting document data, such as, for example, a printer driver, may automatically generate one or more requests corresponding to the operations 406, 410, 414, and 418.

Figure 5:
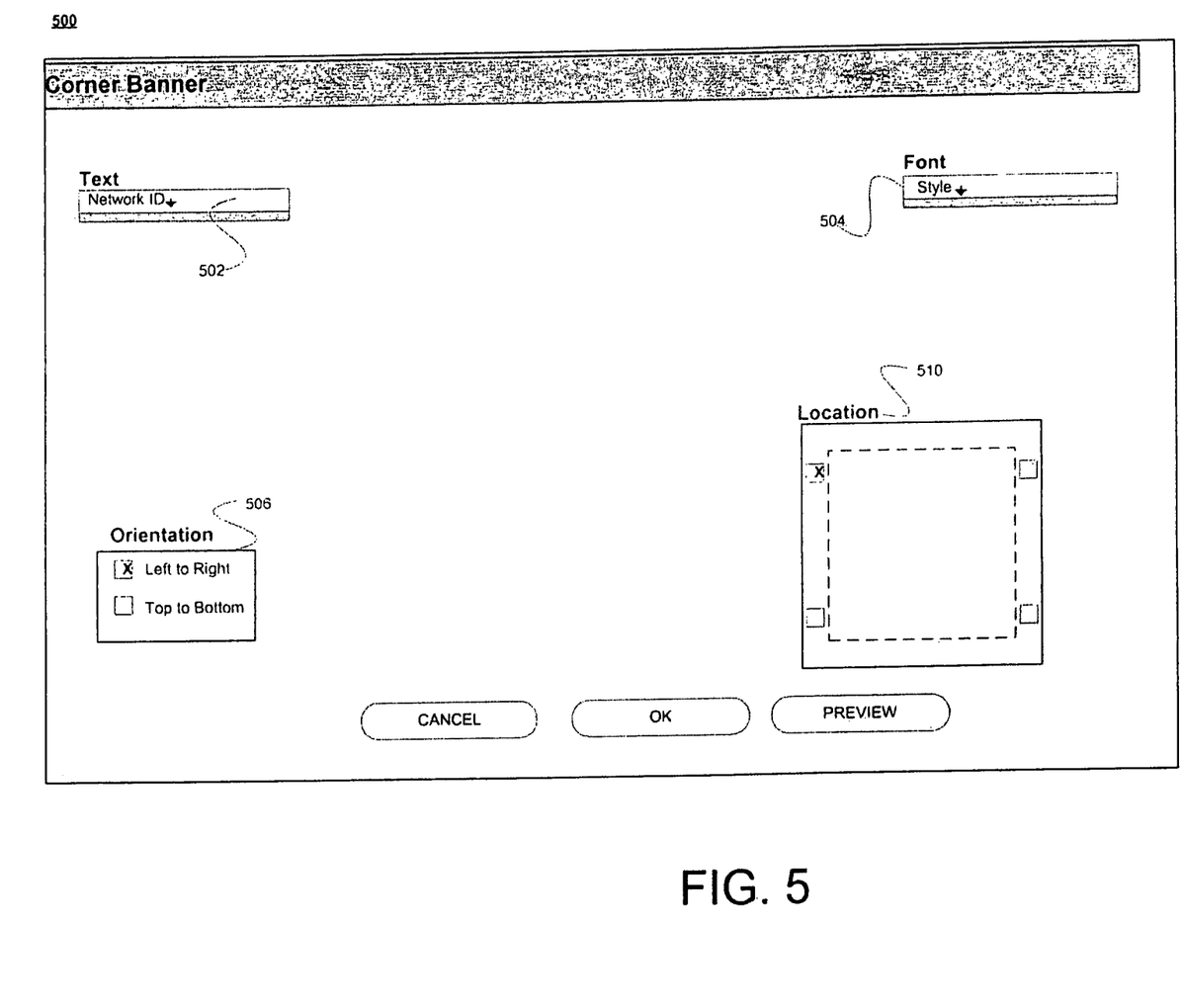
FIG. 5 illustrates an implementation of a user interface for the system of FIG. 1.

FIG. 5 is illustrates a user interface 500 for printed document identification. The user interface 500 may be generated by a device and/or system responsible for formatting document data for printing, such as, for example, a printer interface. The user interface 500 may be similar to the user interface described with respect to the process 400 of FIG. 4.

User interface 500 allows a user to adjust characteristics, including content, format, orientation, and location, of identifying information to be printed on a page of a document. The identifying information may include textual and/or graphical information.

In one implementation, the user interface 500 may be generated for presentation to a user when identifying information associated with a document for printing does not fit in the space between the document margins and the printer allowable margins. The user interface also may be generated by an application that is able to create or edit a document. A user of an application may access the user interface to format identifying information placed on a page of a document. The user interface may be generated prior to a request to print a document.

The user interface 500 includes a first drop-down menu 502, that allows a user to select what identifying information to place on a page of a document printout. A user may choose from a variety of choices of identifying information, such as, for example, a network ID, a user ID, and/or an IP address. Allowing a user to select what identifying information is to be placed on a page also may be accomplished using a variety of other selection options, such as, for example, radio buttons or check boxes.

The user interface 500 also includes a second drop-down menu 504 that allows a user to select font characteristics for the identifying information text selected in menu 502. A user may choose, for example, to alter the style, color, or size of the identifying information text. The user may interact with additional user interfaces that permit alteration of various aspects of the font characteristics.

The user interface 500 additionally includes a cluster of check boxes 506 that allow a user to select an orientation of the identifying information printed. For example, a user may choose to have the identifying information printed from left to right. Alternatively, a user may choose to have the identifying information text printed from top to bottom. Additionally, the cluster of check boxes 506 may contain other options, including, for example, printing diagonally, from right to left, or from bottom to top.

The user interface 500 further includes a graphical representation of a printed page 510 that allows a user to select a location where the identifying information will be placed on the printed page. A user may check a checkbox in an area of the graphical representation corresponding to a desired placement area on a printed page. As one alternative, a user may be presented with textual descriptions of possible placement positions and may select a desired placement.

Although FIG. 5 illustrates one implementation of a user interface for printed document data, other implementations may include fewer, additional, and/or different arrangements of components. For example, the user interface may include a preview window which displays the current appearance of the identifying information and which is updated as selections are made in the user interface. As another example, a user may be allowed to select the page(s) of the document printout on which to place the identifying information. As a further example, a user may be able to disable placement of the identifying information in a printed document. Additionally, if the identifying information includes graphics, a user may be presented with options to change graphical aspects of the identifying information, such as for example, color and/or contrast. As another example, the user interface may be part of a page setup screen for an application or a settings screen for a printer.

A variety of implementations have been described in detail, and a number of other implementations have been mentioned or suggested. Furthermore, a variety of additions, deletions, modifications, and substitutions to these implementations may be made while still achieving printed document identification. For these reasons, other implementations are within the scope of the following claims.

What is claimed is:

1. A computer-implemented method for printing a document, the method comprising:
   receiving document data from an application, the document data comprising data for printing at least a portion of the document;
   accessing information associated with a sender of the document data; and
   formatting a page to be printed such that the page comprises at least a portion of the received document data and the accessed information, and the accessed information is located outside document data areas and inside printer allowable margins,
   wherein formatting the page to be printed comprises checking whether the accessed information for the formatted page fits between the document data areas and the printer allowable margins.

2. The method of claim 1 further comprising initiating an alert if the accessed information for the formatted page does not fit between the document data areas and the printer allowable margins.

3. The method of claim 2 further comprising allowing the format of the accessed information to be changed if the alert is initiated.

4. The method of claim 1 further comprising associating the received document data with the sender of the document data.

5. The method of claim 4 wherein associating the received document data with the sender of the document data comprises determining a sender identifier accompanying the document data.

6. The method of claim 1 wherein accessing information associated with the sender of the document data comprises querying a database comprising sender associated information.

7. The method of claim 1 further comprising generating a printer message comprising the formatted page.

8. The method of claim 1, wherein the application facilitates displaying and editing the document.

9. The method of claim 1, wherein the accessed information comprises information identifying the sender.

10. The method of claim 2 further comprising:
    receiving a request to format the information associated with the sender of document data, wherein the request is responsive to the alert; and
    generating a user interface that allows formatting of the information associated with the sender of document data.

11. The method of claim 10 wherein the user interface allows specification of an orientation in which the information associated with the sender of document data is placed on the page, wherein the orientation is selectable from one of plural possible orientations.

12. The method of claim 10 wherein the user interface allows specification of the information associated with the sender of document data.

13. The method of claim 10 wherein the user interface allows specification of a presentation style of the information associated with a sender of document data.

14. The method of claim 10 wherein the user interface allows specification of a location of the information associated with the sender of document data.

15. A system comprising:
    an apparatus comprising:
        a memory, wherein the memory is operable to store document data from an application, the document data comprising data for printing at least a portion of the document; and
        a processor coupled to the memory, the processor operable to:
            access information associated with a sender of the document data, and
            format a page to be printed such that the page comprises at least a portion of the document data and the accessed information, and the accessed information is located outside document data areas and inside printer allowable margins,
        wherein formatting the page to be printed comprises checking whether the accessed information for the formatted page fits between the document data areas and the printer allowable margins.

16. The system of claim 15 wherein the document data includes data relating to appearance and content of a document.

17. The system of claim 15 wherein the processor is further operable to format the document data in relation with formatting requirements associated with a printer.

18. The system of claim 15 wherein the apparatus comprises a printer driver.

19. The system of claim 15 wherein the processor is further operable to:
    receive a request to format the information associated with the sender of document data, wherein the request is responsive to an alert received indicating that the accessed information does not fit between the document data areas and the printer allowable margins; and
    generate a user interface that allows formatting of the information associated with the sender of document data.

20. The system of claim 19 wherein the user interface allows specification of the content and appearance of the information associated with the sender of document data.

21. The system of claim 15, wherein the application facilitates displaying and editing the document.

22. An article of manufacture comprising a machine-readable medium that stores instructions operable to cause one or more machines to perform operations comprising:
    determining whether document data from an application has been received, the document data comprising data for printing at least a portion of the document;
    accessing information associated with a sender of the document data; and
    formatting a page to be printed such that the page comprises at least a portion of the received document data and the accessed information, and the accessed information is located outside document data areas and inside printer allowable margins,
    wherein formatting the page to be printed comprises checking whether the accessed information for the formatted page fits between the document data areas and the printer allowable margins.

23. The article of claim 22 wherein the instructions are further operable to cause one or more machines to perform operations comprising initiating an alert that the accessed information for the formatted page does not fit between the document data areas and the printer allowable margins.

24. The article of claim 23 wherein the instructions are further operable to cause one or more machines to perform operations comprising allowing the format of the accessed information for the formatted page to be changed.

25. The article of claim 22 wherein the instructions are further operable to cause one or more machines to perform operations comprising associating the received document data with the sender of the document data.

26. The article of claim 22 wherein accessing the information associated with the sender of document data comprises accessing information identifying the sender.

27. The article of claim 23 wherein the instructions are further operable to cause one or more machines to perform operations comprising:

receiving a request to format the information associated with the sender of document data, wherein the request is responsive to the alert; and generating a user interface that allows formatting of the information associated with the sender of document data.

28. The article of claim 22 wherein the user interface allows specification of the content and appearance of the information associated with the sender of document data.

29. The article of claim 22, wherein the application facilitates displaying and editing the document.

30. A system comprising:

memory for storing document data received from an application, the document data comprising data for printing at least a portion of the document, and means for accessing information associated with a sender of the document data, and formatting a page to be printed such that the page comprises at least a portion of the document data and the accessed information, and the accessed information is located outside document data areas and inside printer allowable margins, wherein formatting the page to be printed comprises checking whether the accessed information for the formatted page fits between the document data areas and the printer allowable margins.

31. The system of claim 30 wherein formatting the page to be printed comprises initiating an alert if the accessed information for the formatted page does not fit between the document data areas and the printer allowable margins.

32. The system of claim 30, wherein the application facilitates displaying and editing the document.

33. A computer-implemented method for printing a document, the method comprising:

receiving document data from an application that facilitates displaying and editing the document, the document data comprising data for printing at least a portion of the document;

determining an identifier associated with a sender of the document data;

accessing information associated with the sender identifier, including querying a database comprising sender associated information;

formatting a page to be printed such that the page comprises at least a portion of the received document data and the accessed information, and the accessed information is located outside document data areas and inside printer allowable margins;

checking whether the accessed information for the formatted page fits between the document data areas and the printer allowable margins;

initiating an alert if the accessed information for the formatted page does not fit between the document data areas and the printer allowable margins;

generating a user interface that allows formatting of content, location, orientation, and appearance of information associated with a sender; and generating a printer message comprising the formatted page.

* * * * *